US012639592B2

(12) United States Patent
O'Herlihy et al.

(10) Patent No.: US 12,639,592 B2
(45) Date of Patent: May 26, 2026

(54) SYSTEM AND METHOD FOR ADAPTIVE ORCHESTRATED PROCESS PARALLELIZATION

(71) Applicant: Everseen Limited, Blackpool (IE)

(72) Inventors: Alan O'Herlihy, Glenville (IE); Bogdan Ciubotaru, Donoughmore (IE); Margaret Hartnett, Dublin (IE); Joe Allen, Ballybunion (IE)

(73) Assignee: Everseen Limited, Blackpool (IE)

( * ) Notice: Subject to any disclaimer, the term of this patent is extended or adjusted under 35 U.S.C. 154(b) by 601 days.

(21) Appl. No.: 18/310,170

(22) Filed: May 1, 2023

(65) Prior Publication Data

US 2023/0359909 A1     Nov. 9, 2023

Related U.S. Application Data

(60) Provisional application No. 63/338,262, filed on May 4, 2022.

(51) Int. Cl.
*G06N 5/025*          (2023.01)
*G06F 18/2415*     (2023.01)

(52) U.S. Cl.
CPC ......... *G06N 5/025* (2013.01); *G06F 18/2415* (2023.01)

(58) Field of Classification Search
None
See application file for complete search history.

(56) References Cited

U.S. PATENT DOCUMENTS 10,937,185 B2     3/2021  Pescaru

FOREIGN PATENT DOCUMENTS

WO          2017/112813 A1     6/2017

OTHER PUBLICATIONS

Bewley et al., Simple Online and Realtime Tracking, Jul. 7, 2017, 5 pgs.
Tan et al., EfficientDet: Scalable and Efficient Object Detection, Jul. 27, 2020, 10 pgs.
Artacho et al., UniPose: Unified Human Pose Estimation in Single Images and Videos, Jan. 22, 2020, 10 pgs.
Bochkovskiy et al., YOLOv4: Optimal Speed and Accuracy of Object Detection, Apr. 23, 2020, 17 pgs.
(Continued)

*Primary Examiner* — David R Vincent
(74) *Attorney, Agent, or Firm* — Conley Rose, P.C.

(57)          ABSTRACT

A method of process parallelization includes receiving an insight request from one of a plurality of client systems of a process parallelization system, analyzing the received request to identify subjects, operators, qualifiers and links therein, identifying sensors and their locations needed to capture measurement variables corresponding with the identified subjects, selecting the identified sensors from a bank of available sensors, capturing data acquired by the selected sensors, identifying classifiers operable to detect the identified subjects, selecting the identified classifiers from a bank of available object classifiers and activity classifiers, processing the data captured by the selected sensors using the selected classifiers, configuring rules of an expert system according to the identified subjects, operators, qualifiers and links, processing outputs from the selected classifiers using the expert system rules, compiling an insight data packet (IDP) using the outputs of the selected classifiers, and issuing the IDP to the client systems.

20 Claims, 5 Drawing Sheets

(56) References Cited

OTHER PUBLICATIONS

Porrello et al., Robust Re-Identification by Multiple Views Knowledge Distillation, Jul. 8, 2020, 21, pgs.
Andriluka et al., 2D Human Pose Estimation: New Benchmark and State of the Art Analysis, 2014, 8 pgs.

100

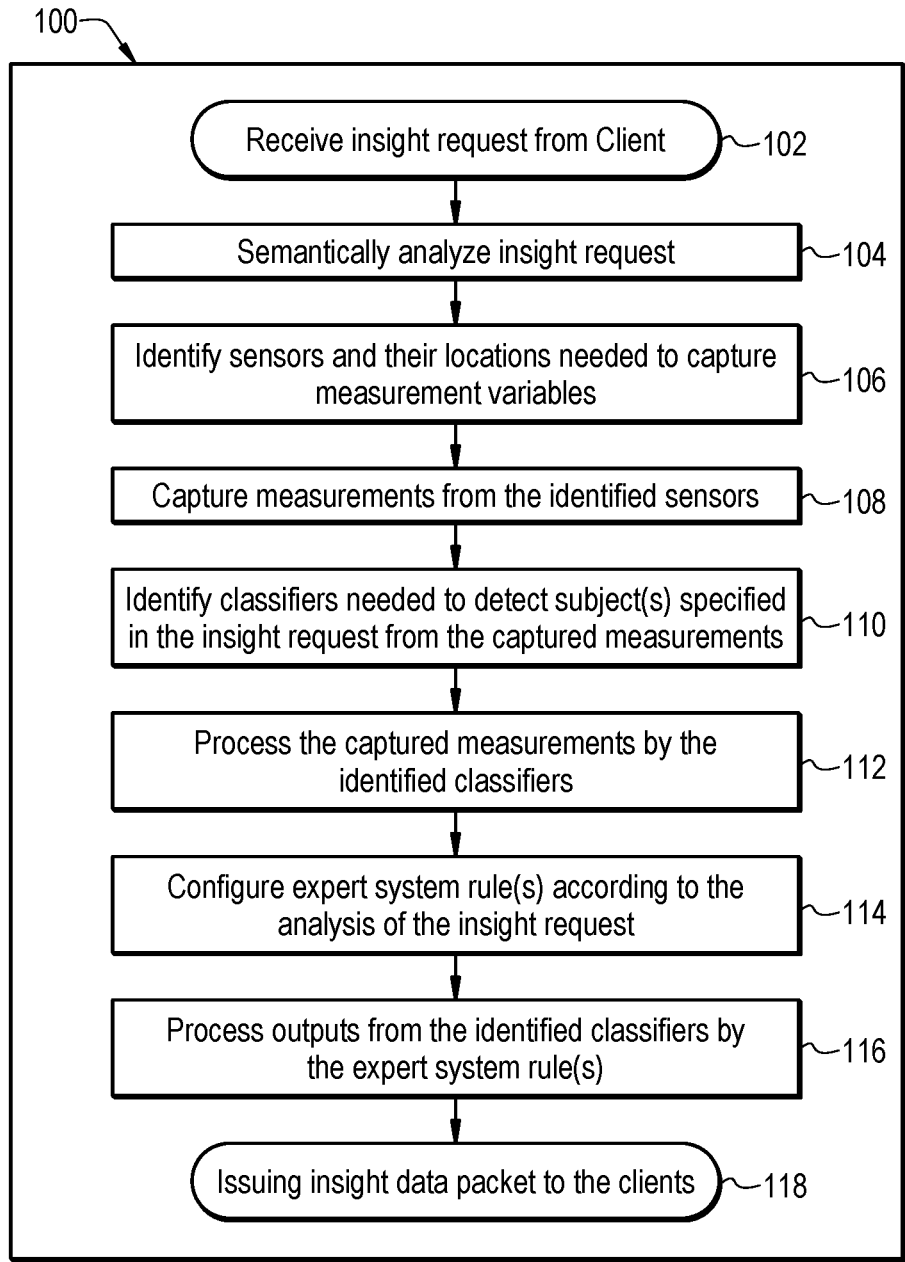

Receive insight request from Client ⟩—102

Semantically analyze insight request —104

Identify sensors and their locations needed to capture measurement variables —106

Capture measurements from the identified sensors —108

Identify classifiers needed to detect subject(s) specified in the insight request from the captured measurements —110

Process the captured measurements by the identified classifiers —112

Configure expert system rule(s) according to the analysis of the insight request —114

Process outputs from the identified classifiers by the expert system rule(s) —116

Issuing insight data packet to the clients ⟩—118

*FIG. 5*

SYSTEM AND METHOD FOR ADAPTIVE ORCHESTRATED PROCESS PARALLELIZATION

CROSS-REFERENCE TO RELATED APPLICATION(S)

This application claims priority to and the benefit of U.S. Provisional Patent Application Ser. No. 63/338,262, filed May 4, 2022, the entire disclosure of which is hereby incorporated by reference.

TECHNICAL FIELD

The present disclosure relates generally to a system and method for allowing multiple users, in parallel, to create/configure their own high-level queries regarding an observed scene. More particularly, the present disclosure relates to a system and method for allowing multiple users, in parallel, to create/configure their own high-level queries regarding an observed scene and receive corresponding high-level results from Artificial Intelligence (AI) systems using data from user-selectable or automatically selected sensors according to a semantic analysis of the high level query.

BACKGROUND

Current approaches to the development of AI based systems are predominantly founded in a reductionist mentality in which point solutions are developed for individual use-case scenarios and are complemented with hard-coding as necessary. Bearing in mind the growing use of AI-based technologies for a wide-range of applications, large numbers of highly-skilled AI experts are needed to develop the required AI solutions. However, there is a growing gap between the pipeline of available AI expertise and the demand for AI solutions.

SUMMARY

In one aspect of the present disclosure, there is provided a process parallelization system. The process parallelization system comprises a core processor communicably coupled with a plurality of sensors and a data packet delivery system coupled with a plurality of client systems through corresponding two-way application programming interfaces (APIs). The core processor comprises a query processor configured to receive an insight request from one of a plurality of client systems. The query processor comprises a semantic analyser configured to analyze the received insight request to identify subjects, operators, qualifiers and links therein, a sensor identifier unit configured to identify sensors and their corresponding locations needed to capture measurement variables corresponding with the identified subjects, and a rule formulator unit configured to generate one or more rules based on the received insight request. Further, the core processor also includes a sensor selector unit configured to select the identified sensors from the plurality of sensors for capturing data pertaining to the identified subjects. Furthermore, the core processor also includes an AI engine configured to identify classifiers operable to detect the identified subjects based on the one or more rules generated by the rule formulator unit, wherein dominant and subordinate objects in the one or more rules from the rule formulator unit serve as identifiers for the selection of classifiers by the AI engine, select the identified classifiers from a bank of available object classifiers and activity classifiers, process, using the selected classifiers, the data captured by the selected sensors, configure the one or more rule(s) of an expert system, within an AI engine of the process parallelization system, according to the subjects, operators, qualifiers and links identified in the received insight request, and process outputs from the selected classifiers using the expert system rules. Moreover, the core processor also includes an insight data packet (IDP) formulator unit configured to compile an IDP using the outputs of the selected classifiers, obtained from the AI engine by processing using the expert system rules, and issue the IDP to the plurality of client systems.

In another aspect of the present disclosure, there is provided a method of process parallelization using a process parallelization system. The method comprises receiving an insight request from one of a plurality of client systems of the process parallelization system. The method also comprises analyzing the received insight request to identify subjects, operators, qualifiers and links therein. Further, the method also comprises identifying sensors and their locations needed to capture measurement variables corresponding with the identified subjects. Furthermore, the method also comprises selecting the identified sensors from a bank of available sensors and capturing data acquired by the selected sensors. Additionally, the method includes identifying classifiers operable to detect the identified subjects and selecting the identified classifiers from a bank of available object classifiers and activity classifiers. Further, the method also includes processing, using the selected classifiers, the data captured by the selected sensors. Furthermore, the method also includes configuring rule(s) of an expert system, within an AI engine of the process parallelization system, according to the subjects, operators, qualifiers and links identified in the received insight request and processing, using the expert system rules, outputs from the selected classifiers. Moreover, the method also includes compiling an IDP using the outputs of the selected classifiers, obtained from processing using the expert system rules, and issuing the IDP to the plurality of client systems of the process parallelization system.

In yet another aspect of the present disclosure, embodiments disclosed herein are also directed to a non-transitory computer readable medium having stored thereon computer-executable instructions which, when executed by a processor, causes the processor to perform the method of process parallelization disclosed herein.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

FIG. 5 is a flowchart of a method for process parallelization, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

The present invention addresses the problem of the growing gap between the pipeline of available AI expertise and the demand for AI solutions, by providing a mechanism for re-use and re-configuration of AI assets and access to AI solutions by multiple users without AI expertise.

Figure 1:
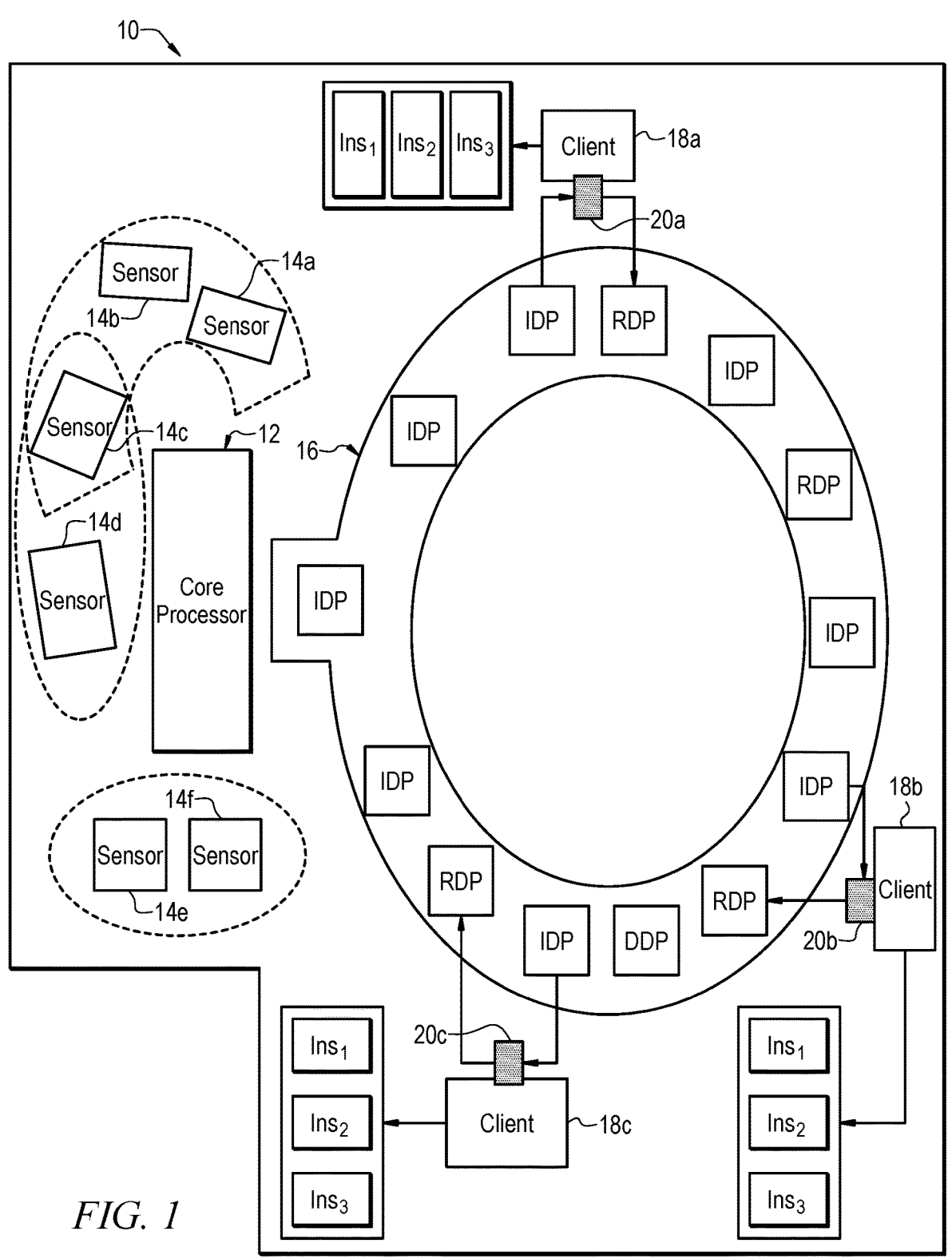
FIG. 1 is a schematic of a process parallelization system, in accordance with an embodiment of the present disclosure.

Referring to FIG. 1, a process parallelization system 10 is depicted, according to an embodiment of the present disclosure. The process parallelization system 10 comprises a core processor 12 communicably coupled with a plurality of sensors 14a, 14b, 14c, 14d, 14e and 14f. The core processor 12 is further communicably coupled with a data packet delivery system 16, which is coupled with a plurality of client systems 18a, 18b and 18c through corresponding two-way application programming interfaces (APIs) 20a, 20b and 20c.

The sensors 14a, 14b, 14c, 14d, 14e and 14f comprise any sensing or monitoring device including but not limited to physical sensors such as video cameras, temperature sensor, weighing scales, pressure sensor, humidity sensor; chemical sensors such as pH sensors and carbon dioxide sensors; and biological/biochemical sensors such as glucose sensors, pathogen sensors etc. For example, an observed scene comprising a checkout area may be monitored by one or more video cameras mounted at predefined positions relative to the checkout area so that the checkout area is disposed within the field of view of each video camera. Similarly, an observed scene comprising a walk-in refrigerator may comprise temperature sensors mounted at predefined positions therein to detect changes in temperature in the refrigerator; and video cameras mounted at predefined positions at an opening/entrance to the refrigerator to detect movements of persons and/or goods therein.

The skilled person will understand that the above-mentioned sensors are provided for illustration purposes only. In particular, the skilled person will acknowledge that the process parallelization system 10 of the present disclosure is not limited to the above-mentioned sensors. On the contrary, the process parallelization system 10 of the present disclosure is, similarly and/or equally, operable with other types sensing devices that are capable of detecting changes in physical, chemical and/or biological attributes of an observed system.

Figure 2:
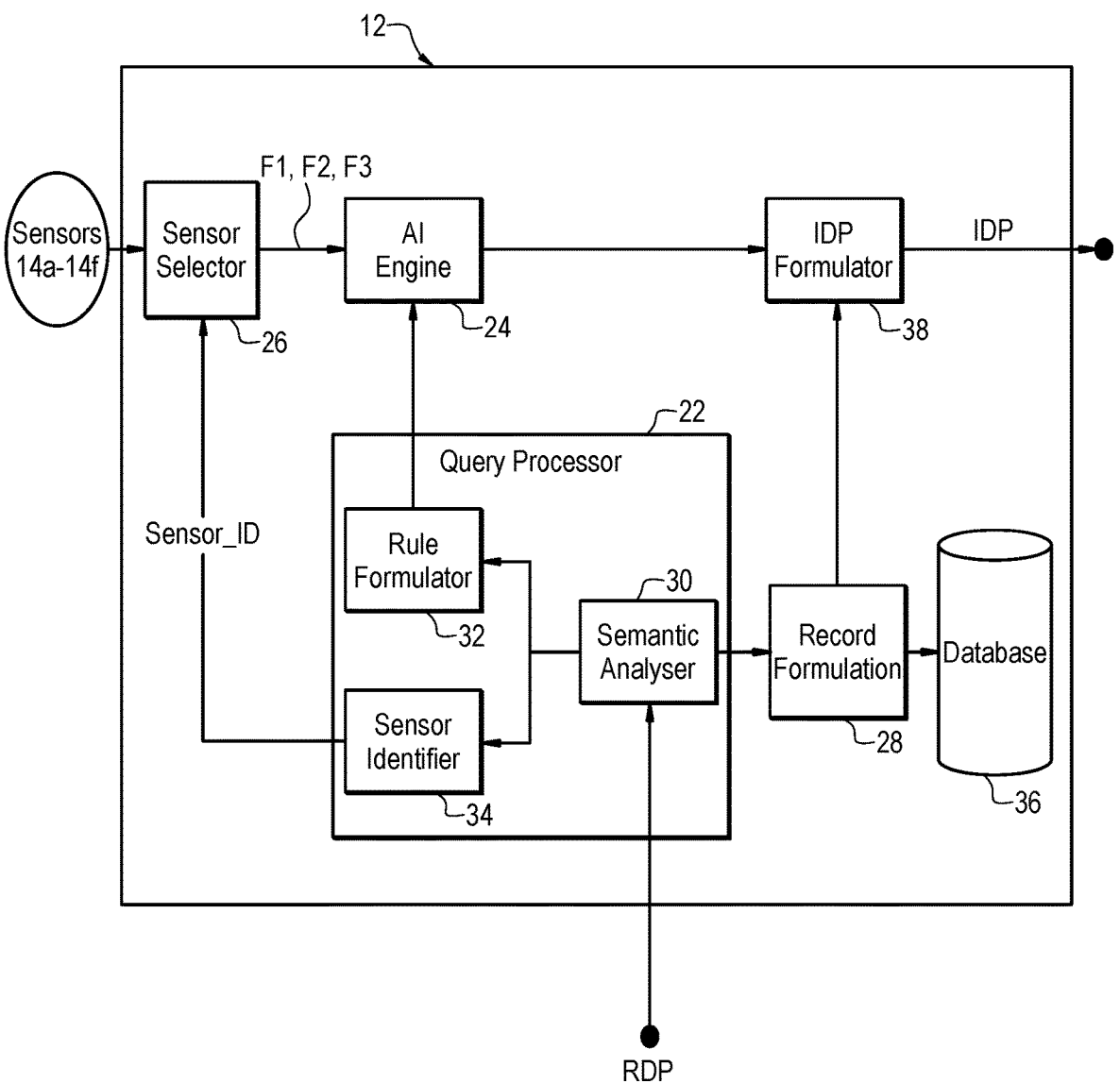
FIG. 2 is a schematic of a core processor of the process parallelization system of FIG. 1, in accordance with an embodiment of the present disclosure.

Referring to FIG. 2 together with FIG. 1, the core processor 12 comprises a query processor 22 communicably coupled with an Artificial Intelligence (AI) engine 24, a sensor selector unit 26 and a record formulation unit 28. The query processor 22 comprises a semantic analyser 30, a rule formulator unit 32 and a sensor identifier unit 34.

The core processor 12 is configured to receive and handle request data packets (RDP) from the client systems 18a, 18b and 18c via the query processor 22. A RDP comprises a request for a user-specified insight regarding a user-specified observed scene. An insight relates to a high-level understanding of an observed scene derived from sensor data collected from the observed scene. The scope and parameters of the high-level understanding are established from criteria set out in a received request, wherein these criteria may include without limitation the application domain, prior knowledge of custom and general, or specific, practice expected to occur, or be followed, within the application domain or within trends therein, a type and availability of sensor data for observed scene in the relevant application domain.

Take for example, a retail environment. A self-checkout store (SCO) non-scan event is one in which a customer who appears to be scanning an item at a self-checkout in fact covers the item's barcode or otherwise moves the item around the self-checkout scanner resulting in the item not being registered by the self-checkout. A SCO walk-through event is one in which a customer at a self-checkout fails to scan one or more, up to all, of the items in their basket or trolley and, as a result, the customer exits the self-checkout with items in their basket or trolley that they have not paid for.

A retail operator may request a first insight via a first query regarding "number of SCO non-scan events occurring at the self-checkouts located closest to the exit of stores in geographic zone 1 between 4 pm and 9 pm local time". Additionally, or optionally, the retail operator may request a second insight regarding "number of SCO non-scan events involving baby formula products occurring at the self-checkouts located closest to the exit of stores in geographic zone 1 between 4 pm and 9 pm local time". Further additionally, or optionally, the retail operator may request a third insight regarding "Number of instances in which a person involved in a SCO walk-through event succeeds in exiting stores in geographic area 1 with unpaid items, between the times of 4 pm and 9 pm local time".

For ease of understanding, explanation to a manner of operation of the process parallelization system 10 will hereinafter be made in conjunction with the above-mentioned exemplary insight requests. However, it should be noted that the above-mentioned exemplary insight requests have been provided merely for explanatory purposes. In particular, persons skilled in the art will acknowledge that the process parallelization system 10 is not limited to answering merely the exemplary insight requests disclosed herein alone. In fact, the process parallelization system 10 of the present disclosure is operable to answer any, type of, insight request that may be formulated by a user for a given application domain.

The insight request may be formulated in a RDP in natural language. Additionally, or optionally, the insight request may be formulated in a prescribed format established in accordance with a known parsing syntax and grammar, including parsing expression grammar (PEG), link grammar and top-down parsing language (TDPL). Persons skilled in the art will acknowledge that the above parsing languages and grammars are merely exemplary and hence, non-limiting of the present disclosure. In particular, the persons skilled in the art will acknowledge that the process parallelization system 10 of the present disclosure is not limited to these parsing languages and grammars. On the contrary, the process parallelization system 10 of the present disclosure is operable with any parsing language and grammar known in the art as being capable of representing the user's insight request in computer-understandable form.

Further, an insight request may be formulated by the user as a selection of objects, operators and qualifiers for the request from a displayed bank of objects, operators and qualifiers, thereby removing the need for the user to have any prior programming knowledge or experience including knowledge or experience of parsing languages, grammars or formal logic representations.

A RDP also includes an identifier of the client system 18a, 18b and 18c from which the request data packet originated and an indicator of whether the insight generated in response to the query may be shared with the rest of the client systems 18a, 18b and 18c of the process parallelization system 10 or if the insight should only be accessible to a specific client system, amongst the client systems 18a, 18b and 18c, from which the RDP originated. Taking for example the retail SCO store scenario mentioned above, a given retailer may not want its competitors to know about SCO non-scan events or SCO walk-through events occurring in its stores. By contrast, take for example a query about a public space such as "Number of people walking dogs and smelling the red-roses in Park A". In this case, sharing the response to this insight request may be in the public interest, so the response could be shared with all the client systems 18a, 18b and 18c of the process parallelization system 10.

The query processor 22 is configured to receive the insight request from a received RDP via the semantic analyser 30. The semantic analyser 30 is configured to semantically analyse the received insight request to identify the dominant subject(s) and the subordinate subject(s) thereof; and the connections therebetween. The semantic analyser 30 is further configured to identify from the received insight request the location(s) associated with the dominant subject(s) and subordinate subject(s) thereof.

Take the first example of a requested insight, namely "number of SCO non-scan events occurring at the self-checkout closest to the exit of stores in geographic zone 1 between 4 pm and 9 pm local time". The dominant subject of this example is SCO non-scan events. The location associated with the dominant subject is the checkout closest to the exit of a store.

Similarly, take the second example of a requested insight, namely "number of SCO non-scan events involving baby formula products occurring at the self-checkouts located closest to the exit of stores in geographic zone 1 between 4 pm and 9 pm local time". The dominant subject of the requested insight is SCO non-scan events and the subordinate subject is baby formula products. The location associated with the dominant subject is the checkout closest to the exit of a store. The location associated with the subordinate subject is the same as the dominant subject in this example. However, a person skilled in the art will understand that depending on the formulation of the received insight request, the location associated with the subordinate subject thereof may differ from the location associated with the dominant subject.

Similarly, take the third example of a requested insight, namely "number of instances in which a person involved in a SCO walk-through event succeeds in exiting stores in geographic area 1 with unpaid items, between the times of 4 pm and 9 pm local time". A first dominant subject in this example is "SCO walk-through event" and a second dominant subject is "person leaving". The second dominant subject is subject to qualification by the geographic requirement that the leaving, or exiting, be from the store exit. Since a SCO walk-through event is done by a person, the link between the first dominant subject and the qualified second dominant subject in this example is the person involved in both the SCO walk-through event and in leaving the store exit. In other words, in the present example, the same person must be involved in both the SCO walk-through event and in leaving the store exit. The location associated with the first and qualified second dominant subjects are the checkout closest to the exit of a store and the exit of the store respectively. The detection of a same person in different locations is performed by a re-identification algorithm as will be discussed later.

The semantic analyser 30 is configured to transmit the identified dominant subject(s) (and/or qualified dominant subject(s)) and identified subordinate subject(s) (and/or qualified subordinate subject(s)); and the connections therebetween to the sensor identifier unit 34. The semantic analyser 30 is further configured to transmit the location(s) associated with the dominant subject(s) and subordinate subject(s) (and/or qualified dominant subject(s) and subordinate subject(s)) to the sensor identifier unit 34.

The sensor identifier unit 34 is configured to receive dominant subject(s), subordinate subject(s) (and/or qualified dominant subject(s) and subordinate subject(s)) and the connections therebetween identified from a received insight request. The sensor identifier unit 34 is further configured to receive the location(s) associated with the dominant subject (s) and subordinate subject(s) (and/or qualified dominant subject(s) and subordinate subject(s)). The sensor identifier unit 34 is further configured to establish from the received dominant subject(s), subordinate subject(s) (and/or qualified dominant subject(s) and subordinate subject(s)), the connections therebetween; and the location(s) associated with the dominant subject(s) and subordinate subject(s) (and/or qualified dominant subject(s) and subordinate subject(s)); measurement variables and corresponding measurement locations.

Take the first example of a requested insight, namely "number of SCO non-scan events occurring at the self-checkout closest to the exit of stores in geographic zone 1 between 4 pm and 9 pm local time". The detection of SCO non-scan events may be made through a comparison of captured video footage of customer activities at a self-checkout with logs of goods registered by the self-checkout. Thus, the measurement variables needed to detect the dominant subject in this example are video footage captured by video camera(s) and transaction logs from self-checkouts. The measurement locations corresponding with the measurement variables are the self-checkout closest to a store exit; and a location sufficiently proximal to the checkout so that the checkout is visible in the captured video footage.

Take the second example of a requested insight, namely "number of SCO non-scan events involving baby formula products occurring at the self-checkouts located closest to the exit of stores in geographic zone 1 between 4 pm and 9 pm local time". The measurement variables needed to detect the dominant subject in this example are video footage captured by video camera(s) and transaction logs from self-checkouts. The measurement locations corresponding with the measurement variables are the self-checkout closest to a store exit; and a location sufficiently proximal to the checkout, so that the checkout is visible in the captured video footage. The measurement variables needed to detect the subordinate subject in this example are video footage captured by video camera(s) and transaction logs from self-checkouts. The measurement locations corresponding with the measurement variables are the self-checkout closest to a store exit; and a location sufficiently proximal to baby formula products at the self-checkout so that the baby formula products are visible in the captured video footage.

Similarly, take the third example of a requested insight, namely "number of instances in which a person involved in a SCO walk-through event succeeds in exiting stores in geographic area 1 with unpaid items, between the times of 4 pm and 9 pm local time". The detection of SCO walk-through events may be made through comparison of captured video footage of customers' trolleys or baskets at a self-checkout with logs of goods registered by the self-checkout. Similarly, the detection of a person leaving the store exit may be made through analysis of captured video footage of the store exit. Thus, the measurement variables needed to detect the first and qualified second dominant subjects in this example are video footage captured by video cameras and transaction logs from self-checkouts. The measurement locations corresponding with the measurement variables are the self-checkout closest to a store exit, a first location sufficiently proximal to the checkout so that the trolleys and baskets beside the checkout are visible in the video footage captured therefrom; and a second location sufficiently proximal to the store exit so that the exit and trolleys passing therethrough are visible in the video footage captured therefrom.

The link between the first dominant subject and qualified second dominant subject in this example is the person involved in both the SCO walk-through event and leaving the store exit. The measurement variables needed to detect this link is video footage of persons at the self-checkout closest to a store exit; and video footage of persons traversing the store exit. The measurement locations corresponding with these measurement variables area location sufficiently proximal to the checkout to enable the capture of identifying features of persons at the checkout; and a location sufficiently proximal to the store exit to enable the capture of identifying features of the persons traversing the store exit.

The sensor identifier unit 34 is configured to use the measurement variables and measurement locations to identify one or more of the sensors 14a-14f whose outputs are required to provide the requested insight. The sensor identifier unit 34 is further configured to transmit identifier(s) (Sensor_ID) of the identified sensor(s) to the sensor selector unit 26. The operations of the sensor selector unit 26 will be discussed later.

The semantic analyser 30 is further configured to identify temporal, further geographic and/or other attributes associated with the dominant subject(s) of a received insight request. Taking the first example of the requested insight "number of SCO non-scan events occurring at the self-checkout closest to the exit of stores in geographic zone 1 between 4 pm and 9 pm local time", the temporal attribute associated with the identified dominant subject thereof is a period between 4 pm and 9 pm local time. Similarly, the geographic and/or other further attributes associated with the identified dominant subject is geographic zone 1. Similarly, taking the second example of the requested insight "number of instances in which a person involved in a SCO walk-through event succeeds in exiting stores in geographic area 1 with unpaid items, between the times of 4 pm and 9 pm local time", the temporal attribute associated with the identified first and second dominant subjects thereof is a period between 4 pm and 9 pm local time. Similarly, the geographic and/or other further attributes associated with the identified first and second dominant subjects is geographic zone 1.

The semantic analyser 30 is configured to transmit the identified dominant subject(s), subordinate subject(s) and links therebetween; and identified temporal, geographic and/or other further attributes of the received insight request to the rule formulator unit 32.

Figure 3:
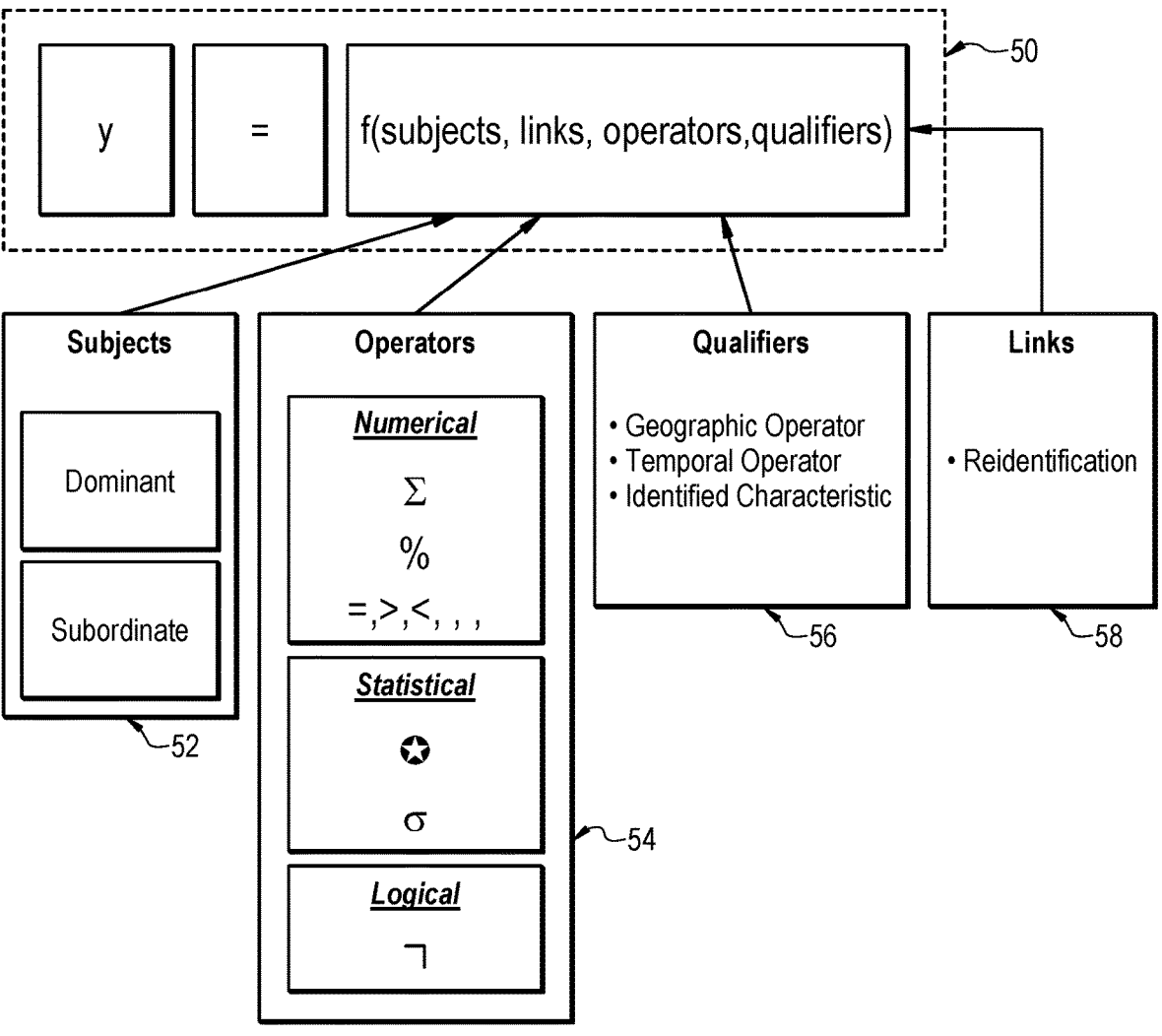
FIG. 3 is a schematic depicting databases of a rule formulator within a query processor of the core processor shown in FIG. 2, in accordance with an embodiment of the present disclosure.

Referring to FIG. 3, the rule formulator unit 32 comprises one or more databases of numerical and statistical operators 54 operable on measurements corresponding with the dominant subject(s) and the subordinate subject(s) of the received insight request. The rule formulator unit 32 further comprises at least one database of logical operators 54 operable on measurements corresponding with the dominant subject(s), the subordinate subject(s) 52 and the link(s) 58 therebetween.

The rule formulator unit 32 is configured to analyse the received insight request to detect the presence of indicator(s) of the required result of received insight request; and a connection between the dominant subject(s), the subordinate subject(s) and the required result. The rule formulator unit 32 is adapted to select from its databases 54, operators corresponding with or associated with the indicator(s) of the required result. The rule formulator unit 32 is adapted to analyse the received insight request to detect the presence of qualifier(s) 56 on the dominant subject(s) 52, the subordinate subject(s) 52 and the links 58 therebetween. The rule formulator unit 32 is adapted to select from its databases 54, operators corresponding with the detected qualifiers 56 according to the expression of the qualifiers in the received insight request.

The rule formulator unit 32 is further configured to assemble the retrieved operators 54, retrieved qualifiers 56, received dominant subjects and subordinate subjects 52 and links 58 therebetween and temporal, geographic and/or other further attributes of the received insight request into a rule 50 which follows the semantic logic of the received insight request provided by the semantic analyser 30. Specifically, a rule could be formulated as, for example, a linear expression or as decision tree structure; and the resulting outputs from a rule may be numerical, graphical, textual or Boolean.

Take the first example of a requested insight, namely "number of SCO non-scan events occurring at the self-checkout closest to the exit of stores in geographic zone 1 between 4 pm and 9 pm local time". The indicator of the required result in this example is the "number" of dominant objects (i.e., SCO non-scan events). Thus, the operator corresponding with this indicator is a summation operator. The qualifiers on the dominant subject in this example are limitations associated with the further geographic and temporal attributes of the requested insight. Thus, the operator corresponding with the qualifiers in the present example are logical 'AND' functions. Accordingly, the rule for this example could be expressed as:

$$y = f(\Sigma \text{NSE}(x) \wedge (\text{Geo}(g_1)) \wedge BT(t_1, t_2)) \tag{1}$$

In this rule, y is an output, x is a measurement, NSE is a detected non-scan event, Geo( ) is a geographical dependency, $g_1$ is geographic zone 1, BT( ) is a temporal dependency denoting a period between two specified times, $t_1$ is 4 pm local time and $t_2$ is 9 pm local time.

Take the second example of a requested insight, namely "number of SCO non-scan events involving baby formula products occurring at the self-checkouts located closest to the exit of stores in geographic zone 1 between 4 pm and 9 pm local time".

The operators in this example are the same as those in the first example. However, the qualifiers comprise an additional element namely the detected presence of the subordinate subject. Accordingly, the rule for this example could be expressed as:

$$y = f(\Sigma NSE(x) \wedge (Geo(g_1)) \wedge BT(t_1, t_2) \wedge Obj(x)) \qquad (2)$$

In this rule, the parameters y, x, NSE, Geo( ) $g_1$, BT( ), $t_1$ are the same as in expression (1) and Obj is the detection of the subordinate object (i.e., baby formula product).

Take the third example of a requested insight, namely "number of instances in which a person involved in a SCO walk-through event succeeds in exiting stores in geographic area 1 with unpaid items between 4 pm and 9 pm local time". The indicator of the required result in this example is the "number" of first dominant objects (i.e., SCO walk-through events) linked with the number of second dominant objects (i.e., person leaving) qualified by the leaving being from the store exit. Thus, the operator corresponding with this indicator is a summation operator. The link between the first dominant object and second dominant object is the reidentification of the same person being involved in both the SCO walk-through events and leaving from the store exit. The qualifier on the second dominant subject in this example is a geographic requirement that the leaving be from a store exit. The qualifier on the linked first dominant subject and qualified second dominant subject in this example are limitations associated with the further geographic and temporal attributes of the requested insight. Thus, the operator corresponding with the qualifiers in the present example are logical 'AND' functions. Accordingly, the rule for this example could be expressed as:

$$y = f(\Sigma(SWT(x_1) \wedge (Leave(x_2) \wedge Geo(Exit))) \wedge ReID \\ (SWT(x_1) \wedge (Leave(x_2) \wedge Geo(Exit))) \wedge (Geo(g_1)) \\ \wedge BT(t_1, t_2)) \qquad (3)$$

In this rule, y is an output; and $x_1$ and $x_2$ are measurements associated with the first dominant subject and the second dominant subject respectively. SWT is a detected SCO walk-through event, Geo( ) is a geographical dependency and Exit is the store exit and $g_1$ is geographic zone 1. ReID is a detected re-identification of a person. BTO is a temporal dependency denoting a period between two specified times, wherein $t_1$ is 4 pm local time and $t_2$ is 9 pm local time.

The skilled person will understand that the above examples of received user insight requests and corresponding formulations of rules therefor is provided for illustration purposes only. In particular, the skilled person will understand that the process parallelization system 10 of the present disclosure is not limited to these examples. On the contrary, the process parallelization system 10 of the present disclosure is operable to implement any formulation suitable for the representation of a received insight request to enable the selection and processing of measurements of variables from an observed scene to enable a suitable response to be generated in answer to the insight request.

Returning to FIG. 2, the rule formulator unit 32 is configured to transmit the generated rule(s) to the AI engine 24. As will be discussed later, the dominant and subordinate objects in the rules from the rule formulator unit 32 are identifiers used for the selection of classifiers (not shown) in the AI engine 24; and the rules themselves form part of a body expert system rules (not shown) of the AI engine 24. The semantic analyser 30 is further configured to detect and identify contextual information, if present, in a received insight request. The semantic analyser 30 is configured to transmit the identified contextual information to the AI engine 24 for use in interpreting the outputs from the classifiers therein as will be discussed later.

The sensor selector 26 is configured to select and combine the outputs from one or more of the sensors 14a-14f according to the identifiers received from the sensor identifier unit 34. Specifically, referring to FIG. 2 together with FIG. 1, the outputs from the sensors 14a, 14b, 14c, 14d, 14e and 14f may be clustered into different configurable combinations to form corresponding sensor families F1, F2 and F3. In the present example, the outputs from sensors 14a, 14b and 14c are combined in sensor family F1. Similarly, the outputs from sensors 14c and 14d are combined in sensor family F2. Further, the outputs from sensors 14e and 14f are combined in sensor family F3. The output from a single sensor may be included in one or more sensor families. For example, the output from sensor 14c is included in sensor family F1 and sensor family F2. By contrast, the output from sensor 14a is included only in sensor family F1.

The outputs from sensors 14 may be combined in a sensor family according to sensor type. For example, a first sensor family may comprise the outputs from a plurality of temperature sensors; and a second sensor family may comprise the outputs from a plurality of pressure sensors. Similarly, the outputs from sensors may be combined in a sensor family according to an application domain. For example, a first sensor family may comprise the outputs from a plurality of video cameras mounted at a checkout area; and a second sensor family may comprise the outputs from a plurality of video cameras mounted in a kitchen area.

Alternatively, the outputs from sensors may be combined in a sensor family according to a category of incidents to be detected. For example, a first sensor family may comprise the outputs from a plurality of video cameras arranged to detect the occurrence of events in which goods are not scanned at a checkout; and a second sensor family may comprise the outputs from a plurality of video cameras arranged to detect the dropping of food on a kitchen floor. Further alternatively, the outputs from sensors may be combined in a sensor family according to a combination of more than one criteria i.e., a plurality of combined criteria, such as location of each sensor and corresponding sensor type. For example, a sensor family may comprise the outputs from all video cameras mounted at checkout areas closest to an entrance/exit from the retail stores in a specified geographic area.

The skilled person will understand that the above-mentioned number and composition of sensor families is provided for illustration purposes only. In particular, the skilled person will acknowledge that the process parallelization system 10 of the present disclosure is in no way limited to the above-mentioned number and composition of sensor families. On the contrary, the process parallelization system 10 of the present disclosure is operable with any number, composition and configuration of sensor families as required by an end user or client associated with the client system 18a, 18b and/or 18c to monitor an observed scene.

In continuation with the foregoing, the number and composition of sensor families F1, F2 and F3 created by the sensor selector 26 is determined by the measurement variables and measurement locations determined from a received insight request by sensor identifier unit 34 of the core processor 12. In effect, the sensor selector 26 creates a mask over the outputs from the sensors 14a-14f, to select and combine those to meet the requirements of a received insight request. Thus, the mask is inherently a representation of the measurement variables of a rule derived by the rule formulator unit 32 from a received insight request.

Taking the first example of a requested insight, namely "number of SCO non-scan events occurring at the self-checkout closest to the exit of stores in geographic zone 1 between 4 pm and 9 pm local time", the sensor(s) selected by the sensor selector 26 comprise video camera(s) located sufficiently proximal to a checkout closest to a store exit, so that the checkout is visible in the video footage captured by the video camera(s). The sensor(s) selected by the sensor selector 26 further comprise the transaction logs of the corresponding checkout.

Similarly, taking the second example of a requested insight, namely "number of SCO non-scan events involving baby formula products occurring at the self-checkouts located closest to the exit of stores in geographic zone 1 between 4 pm and 9 pm local time", the sensor(s) selected by the sensor selector 26 comprise video camera(s) located sufficiently proximal to a checkout closest to a store exit, so that the checkout and baby formula products at the checkout are visible in the video footage captured by the video camera(s). The sensor(s) selected by the sensor selector 26 further comprise the transaction logs of the corresponding checkout.

Further, taking the third example of a requested insight, namely "number of instances in which a person involved in a SCO walk-through event succeeds in exiting stores in geographic area 1 with unpaid items, between the times of 4 pm and 9 pm local time", the sensors selected by the sensor selector 26 comprise the following:

video camera(s) located sufficiently proximal to a checkout closest to a store exit so that the checkout and trolleys and/or baskets beside the checkout are visible in the video footage captured by the video camera(s);

video camera(s) located sufficiently proximal to the store exit so that the exit and trolleys passing therethrough are visible in the video footage captured by the video camera(s); and transaction logs of the corresponding checkout.

In the event, a sensor is not available to produce measurement variables that satisfy the requirements of a received insight request, a dialogue data packet (DDP) will be issued to the client system 18a, 18b or 18c from where the insight request originated, as will be discussed later.

A stream of captured data from each sensor family F1, F2 and F3 is transmitted to the AI engine 24. In other words, the AI engine 24 is configured to receive the outputs from the sensor families created by the sensor selector 26.

Figure 4:
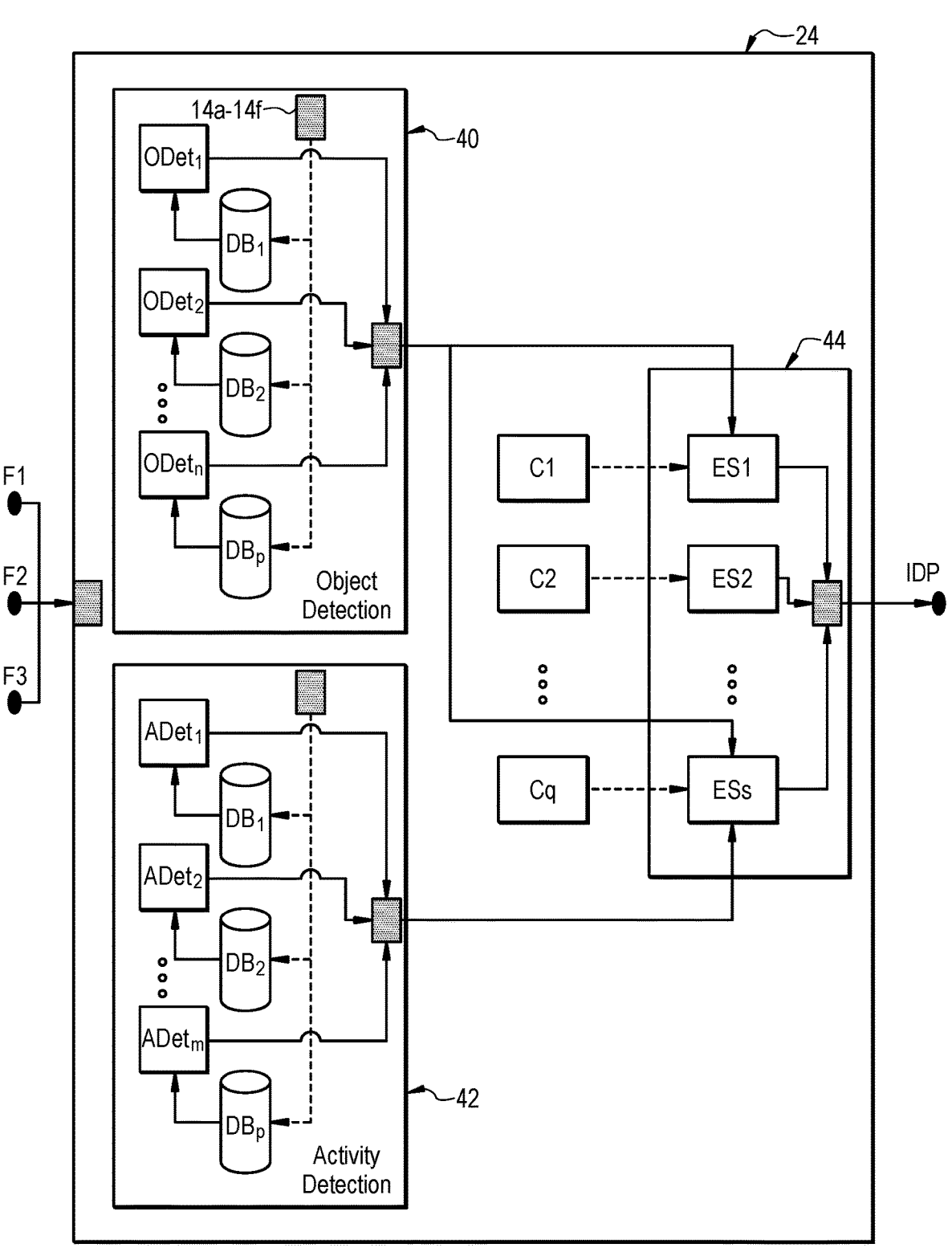
FIG. 4 is a schematic of an AI engine in the core processor of the process parallelization system from FIG. 2, in accordance with an embodiment of the present disclosure.

Referring to FIG. 4, the AI engine 24 comprises an object detection block 40 and an activity detection block 42 communicably coupled with an expert system block 44. The object detection block 40 comprises a plurality of object recognition engines $ODet_1$, $ODet_2$, . . . , $ODet_n$; and the activity detection block 42 comprises a plurality of activity recognition engines $ADet_1$, $ADet_2$, . . . $ADet_m$.

The object recognition engines $ODet_1$, $ODet_2$, . . . , $ODet_n$ comprise a corresponding plurality of object recognition algorithms (not shown). In one embodiment, an object recognition algorithm comprises a deep neural network whose architecture is substantially based on YOLOv4 (as described in A Bochkovskiy, C-Y Wang and H-Y M Liao, 2020 arXiv: 2004.10934) or the EfficientDet (as described in M. Tan, R. Pang and Q. V. Le, EfficientDet: Scalable and Efficient Object Detection, 2020 *IEEE/CVF Conference on Computer Vision and Pattern Recognition* (*CVPR*), Seattle, WA, USA, 2020, pp. 10778-10787). However, the skilled person will understand that these object recognition deep neural network architectures are provided for example purpose only. In particular, the skilled person will understand that the process parallelization system 10 of the present disclosure is not limited to these deep neural network architectures. On the contrary, the process parallelization system 10 of the present disclosure is operable with any object recognition architecture and/or training algorithm which is suitable for the detection/recognition and classification of specified objects in an image or video frame.

The objects may include persons, vehicles, pallets, food items or other artifacts as specified by an operator. The skilled person will understand that the above-mentioned objects are merely exemplary in nature and hence, provided herein for illustration purpose only. In particular, the skilled person will understand that the process parallelization system 10 of the present disclosure is not limited to the detection of these objects alone. On the contrary, the process parallelization system 10 of the present disclosure is operable to detect the presence of, and recognize, any type of specified object/s within an image or video frame.

The activity recognition engines $ADet_1$, $ADet_2$, . . . $ADet_m$ comprise a corresponding plurality of activity recognition algorithms (not shown). For example, the activity recognition algorithms may detect changes in articulate body poses of persons detected in a captured video stream as described in U.S. Pat. No. 10,937,185. Another suitable mechanism for pose detection is to use the UniPose neural network architecture such as that disclosed in Artacho, B. and Savakis, A., 2020. UniPose: Unified Human Pose Estimation in Single Images and Videos. arXiv preprint arXiv:2001.08095. This neural network uses historical information to enable a temporal component to be considered in estimating joint movement. This network also considers blurring and occlusions. Changes in detected pose are then correlated with specified actions such as bending, stretching, running and other commonly known stances and poses known in the art to be performed by human beings.

The skilled person will understand that the above-mentioned pose detection algorithms are provided for illustration purpose only. In particular, the skilled person will understand that the process parallelization system 10 of the present disclosure is not limited to these pose detection algorithms. On the contrary, the process parallelization system 10 of the present disclosure is operable with any pose detection architecture and/or training algorithm which is suitable for the detection and classification of objects, particularly, animate objects e.g., humans and/or animals detected in captured video footage of an observed scene. The skilled person will further understand that the above-mentioned activities determined from detected pose changes are also provided for illustration purposes only. In particular, the skilled person will understand that the process parallelization system 10 of the present disclosure is not limited to the detection of these activities. On the contrary, the process parallelization system 10 of the present disclosure is operable to detect any specified activity that may be correlated with detected pose changes of humans and/or animals detected in captured video footage of an observed scene.

The object recognition algorithms (not shown) and the activity recognition algorithms (not shown) of the object recognition engines $ODet_1$, $ODet_2$, . . . , $ODet_n$, and the activity recognition engines $ADet_1$, $ADet_2$, . . . $ADet_m$ respectively may be trained with data housed in corresponding training data databases $DB_1$ to $DB_p$, where $p \leq m+n$. For example, training of the Unipose network may be implemented in one configuration as outlined in Mykhaylo Andriluka, Leonid Pishchulin, Peter Gehler, and Bernt Schiele. 2d human pose estimation: New benchmark and state of the art analysis. In IEEE Conference on Computer Vision and Pattern Recognition (CVPR), June 2014.

The training data databases $DB_1$ to $DB_p$ comprise historical examples of the object and/or activity to be detected. The examples are acquired from video footage captured from a variety of settings and observed subjects. For example, the data used to detect a bending activity may comprise examples of persons of different genders, age, skin colour and overall build. In any case, the composition of the examples in the training data databases $DB_1$ to $DB_p$ are balanced to improve heterogeneity and reduce the risk of unintended bias in the detections made by the trained object recognition engines $ODet_1$, $ODet_2$, . . . , $ODet_n$ and activity recognition engines $ADet_1$, $ADet_2$, . . . $ADet_m$. To further improve the generalization capabilities the object recognition engines $ODet_1$, $ODet_2$, . . . , $ODet_n$ and activity recognition engines $ADet_1$, $ADet_2$, . . . $ADet_m$, examples contained in the training data databases $DB_1$ to $DB_p$ are also captured under a variety of environmental conditions including lighting, wind and other conditions known to persons skilled in the art that may also change over time. To maintain the currency of the training data databases $DB_1$ to $DB_p$, further examples may be added thereto from the data captured by the sensors 14a, 14b, 14c, 14d, 14e and 14f, as will be discussed below.

The AI engine 24 may further comprise a plurality of contextualiser units C1 to Cq. The contextualiser units C1 to Cq may include a plurality of user-supplied contextual information regarding tacit or explicitly articulated rules or customs followed by participants within the observed scenes. For example, the contextualiser units C1 to Cq may include contextual information identified in a received insight request by the semantic analyser 30 and transmitted to the AI engine 24. The contextual information is used to assist in the interpretation of the activities and/or objects detected by the object recognition engines $ODet_1$, $ODet_2$, . . . , $ODet_n$ and activity recognition engines $ADet_1$, $ADet_2$, . . . $ADet_m$. In one embodiment, the contextual information may be used to exclude a detected activity from further consideration or reporting to a user, unless otherwise specified. For example, it could be common practice in an observed scene for all the people working therein to depart for a coffee break at a given time. Thus, on detection by the activity recognition engines $ADet_1$, $ADet_2$, . . . $ADet_m$ of the movement of people in the observed scene towards an exit thereof at the specified time, the cause of the detected movement can be inferred to be the customary coffee break whose occurrence may not be of interest to the user.

In other embodiments, the contextual information may be used to highlight a particular detected activity for more detailed further analysis or reporting to a user. Using the previous example, the detection of the re-entry of a first person into the observed scene without the other people working there and the handling by the first person of personal items of the other people may be a cause for concern which requires further analysis.

The skilled person will understand that the above-mentioned scenarios and associated contextual interpretation and consequences have been provided herein for the purpose of illustration only. In particular, the skilled person will understand that the process parallelization system 10 of the present disclosure is not limited to these scenarios and associated contextual interpretation and consequences. On the contrary, the process parallelization system 10 of the present disclosure is operable with any type of scenario/s and associated contextual interpretation and consequences as provided by the users to facilitate the interpretation of the activities and/or objects detected by the object recognition engines $ODet_1$, $ODet_2$, . . . , $ODet_n$ and activity recognition engines $ADet_1$, $ADet_2$, . . . $ADet_m$.

The AI engine 24 further comprises an expert system block 44 comprising a plurality of expert systems ES1 to ESs. The expert systems ES1 to ESs are communicably coupled with the plurality of object recognition engines $ODet_1$, $ODet_2$, . . . , $ODet_n$ and the plurality of activity recognition engines $ADet_1$, $ADet_2$, . . . $ADet_m$. The expert systems ES1 to ESs comprise one or more rules received from the rule formulator unit 32. Specifically, an expert system from the expert system block 44 is configured to process an output from one or more of the object recognition engine(s) $ODet_1$, $ODet_2$, . . . , $ODet_n$ and/or the activity recognition engine(s) $ADet_1$, $ADet_2$, . . . $ADet_m$ selected from the object detection block 40 and/or the activity detection block 42, wherein the selected object recognition engine(s) and the activity recognition engine(s) correspond with a dominant subject and/or a subordinate subject specified in a rule of the expert system 44.

Thus, for a first example of a requested insight, namely "number of SCO non-scan events occurring at the self-checkout closest to the exit of stores in geographic zone 1 between 4 pm and 9 pm local time", the corresponding expert system is configured to receive the outputs from an activity recognition engine $ADet_1$, $ADet_2$, . . . $ADet_m$ trained to detect a SCO non-scan event. The outputs from the activity recognition engine are generated in response to:

(a) received video footage captured by video camera(s) located sufficiently proximal to a checkout closest to a store exit, so that the checkout is visible in the video footage; and (b) transaction logs received from the checkout.

Similarly, take the second example of a requested insight, namely "number of SCO non-scan events involving baby formula products occurring at the self-checkouts located closest to the exit of stores in geographic zone 1 between 4 pm and 9 pm local time". The corresponding expert system is configured to receive the outputs from an activity recognition engine $ADet_1$, $ADet_2$, . . . $ADet_m$ trained to detect a SCO non-scan event. The outputs from the activity recognition engine are generated in response to:

(a) received video footage captured by video camera(s) located sufficiently proximal to a checkout closest to a store exit, so that the checkout and baby formula products at the checkout are visible in the video footage; and (b) transaction logs received from the checkout.

Similarly, take the third example of a requested insight, namely "number of instances in which a person involved in a SCO walk-through event succeeds in exiting stores in geographic area 1 with unpaid items, between the times of 4 pm and 9 pm local time". The corresponding expert system is configured to receive the outputs from two activity recognition engines $ADet_1$, $ADet_2$, . . . $ADet_m$ respectively trained to detect a SCO walk-through event and a person leaving the store. The outputs from the first activity recognition engine are generated in response to:

(a) received video footage captured by video camera(s) located sufficiently proximal to a checkout closest to a store exit so that the checkout and trolleys and/or baskets beside the checkout are visible in the video footage; and (b) transaction logs received from the checkout.

The outputs from the second activity recognition engine are generated in response to received video footage captured by video camera(s) located sufficiently proximal to the store exit so that the exit and trolleys passing therethrough are visible in the video footage.

As shown, the expert systems ES1 to ESs may also be communicably coupled with the or each of the contextualiser units C1 to Cq. The expert systems ES1 to ESs may further include dependencies associated with one or more items of contextual data received from the contextualiser units C1 to Cq.

An expert system rule may include a link between the outputs of individual object recognition engines $ODet_1$, $ODet_2$, . . . , $ODet_n$ and activity recognition engines $ADet_1$, $ADet_2$, . . . $ADet_m$ contained therein, wherein the link may be executed by way of an additional classifier. In the aforementioned third example, the link is the reidentification of the same person being involved in both the SCO walk-through and leaving the store via the store exit. The reidentification operation is executed by way of a reidentification engine (not shown) which may employ a coarse-to-fine pyramid model in a multi-loss dynamic training approach implemented by way of a standard ResNet architecture or a BN-Inception architecture. Alternatively, the reidentification engine (not shown) may employ a SORT algorithm (as described by Bewley A, Ge Z., Ott L., Ramos F. and Uperoft B., Simple Online and Realtime Tracking 2016 *IEEE International Conference on Image Processing* (*ICIP*), Phoenix, AZ, 2016, pp. 3464-3468) or a DeepSort algorithm (as described in Porrello A., Bergamini L. and Calderara S., Robust Re-identification by Multiple View Knowledge Distillation, Computer Vision, ECCV 2020, Springer International Publishing, European Conference on Computer Vision, Glasgow, August 2020).

The skilled person will understand that the above-mentioned examples of person re-identification algorithms are provided for illustration purposes only. In particular, the skilled person will acknowledge that the process parallelization system 10 of the present disclosure is in no way limited to the use of these aforementioned person re-identification algorithms. On the contrary, the process parallelization system 10 of the present disclosure is operable with any re-identification algorithm capable of supporting a link between the outputs of individual object recognition engines $ODet_1$, $ODet_2$, . . . , $ODet_n$ and the individual activity recognition engines $ADet_1$, $ADet_2$, . . . $ADet_m$ indicative of the same person or thing being involved in different activities or moving between different geographic locations specified in a received insight request.

Further, the skilled person will also understand that re-identification is not the only manner in which the link between the outputs of individual object recognition engines $ODet_1$, $ODet_2$, . . . , $ODet_n$, and activity recognition engines $ADet_1$, $ADet_2$, . . . $ADet_m$ contained in a given expert system rule may be executed. In particular, the skilled person will understand that the above discussion of re-identification is provided to complete the description of the aforementioned third example. Thus, the above discussion of re-identification is provided for illustration purposes only. In particular, the skilled person will acknowledge that the process parallelization system 10 of the present disclosure is in no way limited to the use of re-identification to link the outputs of the individual object recognition engines $ODet_1$, $ODet_2$, . . . , $ODet_n$ and the individual activity recognition engines $ADet_1$, $ADet_2$, . . . $ADet_m$ contained in an expert system rule. On the contrary, the process parallelization system 10 of the present disclosure is operable with any algorithm which may support temporal, geographic or situational linking of the outputs of individual object recognition engines $ODet_1$, $ODet_2$, . . . , $ODet_n$ and activity recognition engines $ADet_1$, $ADet_2$, . . . $ADet_m$ as set out in the received insight request.

In this way, the AI engine 12 is operable to process received requests from the plurality of client systems 18a, 18b and 18c in parallel through:

simultaneous processing of the measurements captured by different combinations and permutations of measurement sensors by a plurality of object recognition engines and/or activity recognition engines simultaneous use of the outputs from different combinations and permutations of the object recognition engines and/or activity recognition engines by a plurality of expert system rules configured according to each received request.

If a dominant subject or a subordinate subject of a received insight request is not detectable with any of the object recognition engines $ODet_1$, $ODet_2$, . . . , $ODet_n$ or activity recognition engines $ADet_1$, $ADet_2$, . . . $ADet_m$ in the object detection block 40 or the activity detection block 42, a dialogue data packet (DDP) will be issued to the client system 18a, 18b or 18c from where the insight request originated, as will be discussed later.

Combining FIG. 4 with FIG. 2, the output from the expert system block 44 of the AI engine 24 is transmitted to an insight data packet (IDP) formulator 38. The IDP formulator 38 is configured to establish a link between the received output from an individual expert system in the AI engine 24 and the RDP from which the insight request, expressed by the rule of the expert system, originated.

Specifically, the IDP formulator 38 is configured to compile an IDP from:

(a) output from corresponding expert system;

(b) the received output of an individual expert system in the AI engine 24; and (c) tags matching the client system identifiers and privacy status indicators of the corresponding request data packet RDP.

Specifically, the IDP includes a client system identifier tag which identifies the client system 18a, 18b or 18c from which, or from where, the request data packet corresponding with the IDP originated. The IDP also includes a Boolean privacy tag, wherein a value of 0 indicates that the output of the expert system may be shared with the rest of the client systems 18a, 18b and 18c of the process parallelization system 10; and a value of 1 indicates that the output of the expert system is only accessible by the client system 18a, 18b or 18c from which, or from where, the request data packet originated.

To support later auditing and amendment of insight requests received from individual client systems 18a, 18b and/or 18c and rules formulated from those insight requests, the core processor 12 comprises a database 36 configured to house the details of received RDP.

Combining FIG. 2 with FIG. 1, IDPs created by the IDP formulator 38 are issued onto the packet delivery system 16. The issuance may be preceded by a broadcast issued packet delivery system 16 providing advance warning to the client systems 18a, 18b and 18c of the imminent issuance of an IDP related to a specific received RDP.

Once issued onto the packet delivery system 16, an IDP is circulated to all the client systems 18*a*, 18*b* and 18*c* subscribed to the process parallelization system 10 (hereinafter simply referred to as "clients", "subscribed clients" or "subscribed client systems" and denoted using identical reference numerals 18*a*, 18*b* and 18*c*). The two-way APIs 20*a*, 20*b* and 20*c* permit subscribed client systems 18*a*, 18*b* and 18*c* to access the IDP depending on the values of the client system's privacy tag and identifier tag.

Specifically, in the event that the privacy tag of the IDP is valued, for example, 0, all of the client systems 18*a*, 18*b* and 18*c* may access the IDP through the APIs 20*a*, 20*b* and 20*c* to retrieve the output from the expert system contained in the insight data packet (IDP). In the event the privacy tag of the IDP is valued, for example, 1, the client identifier tag of the insight data packet (IDP) is inspected by the APIs 20*a*, 20*b* and 20*c* of the subscribed client systems 18*a*, 18*b* and 18*c*. In the event of a match between the client identifier tag and an identifier of a subscribed client system, the subscribed client system may access the insight data packet (IDP) through the APIs to retrieve the output from the expert system contained in the IDP.

Once circulated amongst the client systems 18*a*, 18*b* and 18*c*, the insight data packet (IDP) may be returned to the core processor 12, which may optionally examine a time stamp of the IDP. If the time elapsed since that of the time stamp is less than a preconfigured threshold, the core processor 12 may optionally re-issue the IDP on the packet delivery system 16. Otherwise, the core processor 12 may optionally store the IDP in the database 36.

The core processor 12 may also create a DDP in the event a sensor is not available to produce measurement variables that satisfy the requirements of a received insight request or if a dominant subject or a subordinate subject of a received insight request is not detectable with any of the object recognition engines or activity recognition engines of the AI engine 12. A DDP includes a privacy tag and client identifier tag established and operable as described above in connection with IDP. A DDP further includes a narrative explaining the absence of a suitable sensor(s) and/or object recognition engine(s) or activity recognition engine(s); and requesting the client systems 18*a*, 18*b* and 18*c* to advise whether they want to continue with the corresponding RDP, which may entail further costs to establish the required sensor(s) and/or object recognition engine(s) or activity recognition engine(s). The client systems allowed to access the DDP according to the privacy tag and client identifier tag thereof, may include a response in the DDP together with an identifier of the responding client system. The resulting DDP may be issued by the responding client system onto the packet delivery system 16 from which the DDP is returned to the core processor 12 for consideration by the operators of the process parallelization system 10.

Referring to FIG. 5, a method 100 of process parallelization comprises the steps of:

receiving 102 an insight request from one of a plurality of subscribed clients of the process parallelization system;

analyzing 104 the received insight request to identify subjects, operators, qualifiers and links therein;

identifying 106 sensors and their locations needed to capture measurement variables corresponding with the identified subjects;

selecting (not shown) the identified sensors from a bank of available sensors;

capturing 108 data acquired by the selected sensors;

identifying 110 classifiers operable to detect the identified subjects;

selecting (not shown) the identified classifiers from a bank of available object classifiers and activity classifiers;

processing 112 by the selected classifiers the data captured by the selected sensors;

configuring 114 rule(s) of an expert system according to the subjects, operators, qualifiers and links identified in the received insight request;

processing 116 by the expert system rules the outputs from the selected classifiers;

compiling (not shown) an insight data packet from the results of the processing by the expert system rules; and issuing 118 the resulting insight data packet to the subscribed clients of the process parallelization system.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A process parallelization system comprising:

a core processor communicably coupled with a plurality of sensors and a data packet delivery system coupled with a plurality of client systems through corresponding two-way application programming interfaces (APIs), wherein the core processor comprises:

a query processor configured to receive an insight request from one of the plurality of client systems, the query processor comprising:

a semantic analyser configured to analyze the received insight request to identify subjects, operators, qualifiers and links therein; and a sensor identifier unit configured to identify sensors and their corresponding locations needed to capture measurement variables corresponding with the identified subjects;

a rule formulator unit configured to generate one or more rules based on the received insight request;

a sensor selector unit configured to select the identified sensors from the plurality of sensors for capturing data pertaining to the identified subjects;

an artificial intelligence (AI) engine configured to:

identify classifiers operable to detect the identified subjects based on the one or more rules generated by the rule formulator unit, wherein dominant and subordinate objects in the one or more rules from the rule formulator unit serve as identifiers for the selection of classifiers by the AI engine;

select the identified classifiers from a bank of available object classifiers and activity classifiers;

process, using the selected classifiers, the data captured by the selected sensors;

configure the one or more rules in an expert system, of the AI engine of the process parallelization system, according to the subjects, operators, qualifiers and links identified in the received insight request;

process, using the expert system rules, outputs from the selected classifiers;

an insight data packet (IDP) formulator unit configured to:

compile an IDP using the outputs of the selected classifiers, obtained from the AI engine by processing using the expert system rules; and issuing the IDP to the plurality of client systems.

2. The process parallelization system of claim 1, wherein the semantic analyser is configured to identify and transmit dominant subjects, subordinate subjects, any links therebetween, and temporal, geographic and other further attributes of the received insight request to the rule formulator unit.

3. The process parallelization system of claim 2, wherein the rule formulator unit comprises:

a database of numerical and statistical operators operable on measurements corresponding with the dominant subjects and the subordinate subjects of the received insight request; and a database of logical operators operable on measurements corresponding with the dominant subjects, the subordinate subjects and the links therebetween.

4. The process parallelization system of claim 1, wherein a number and composition of sensor families created by the sensor selector is determined by measurement variables and measurement locations determined from a received insight request by a sensor identifier unit of the core processor.

5. The process parallelization system of claim 1, wherein if a sensor is not available to produce measurement variables that satisfy the requirements of a received insight request, the core processor creates a dialogue data packet (DDP) that is issued to the client system from where the insight request originated.

6. The process parallelization system of claim 1, wherein the AI engine comprises an object detection block and an activity detection block communicably coupled with an expert system block having the expert system therein; and wherein the object detection block comprises a plurality of object recognition engines; and wherein the activity detection block comprises a plurality of activity recognition engines.

7. The process parallelization system of claim 6, wherein the object recognition engines comprise a corresponding plurality of object recognition algorithms and the activity recognition engines comprise a corresponding plurality of activity recognition algorithms.

8. The process parallelization system of claim 7, wherein the AI engine further comprises a plurality of contextualiser units that include a plurality of user-supplied contextual data regarding at least one of: tacit, explicitly articulated rules and customs followed by subjects within the observed scenes that are used to assist in the interpretation of the objects and activities detected by the object recognition engines and activity recognition engines respectively.

9. The process parallelization system of claim 8, wherein the AI engine comprises an expert system block having a plurality of expert systems communicably coupled with the plurality of object recognition engines and the plurality of activity recognition engines, and wherein the plurality of expert systems comprise one or more rules received from the rule formulator unit to process an output from one or more of the plurality of object recognition engines and the plurality of activity recognition engines selected from the object detection block and the activity detection block such that the selected one or more object recognition engines and the selected one or more activity recognition engines correspond with the dominant subjects and the subordinate subjects specified in the one or more rules of the expert system.

10. The process parallelization system of claim 9, wherein the expert system rule includes a link between the outputs of individual object recognition engines and activity recognition engines contained within the expert system of the AI engine, and wherein the link is executed by the expert system using an additional classifier.

11. The process parallelization system of claim 10, wherein the AI engine is operable to process insight requests received from the plurality of client systems in parallel through at least one of:

simultaneous processing of the measurements captured by different combinations and permutations of measurement sensors by the plurality of object recognition engines and activity recognition engines; and simultaneous use of the outputs from different combinations and permutations of the object recognition engines and activity recognition engines by the plurality of expert system rules configured according to each received insight request.

12. The process parallelization system of claim 11, wherein the IDP formulator is configured to establish a link between the received output from an individual expert system in the AI engine and a request data packet (RDP) from which the insight request, expressed by the rule of the expert system, originated.

13. The process parallelization system of claim 12, wherein the IDP formulator is configured to compile the IDP using:

the output received from the expert system in the AI engine; and one or more tags matching the client identifiers and privacy status indicators of the corresponding RDP.

14. The process parallelization system of claim 13, wherein the core processor comprises a database configured to store details of received RDP for facilitating at least one of:

auditing and amendment of the insight requests received from individual client systems and rules formulated from corresponding insight requests.

15. The process parallelization system of claim 14, wherein the two-way APIs are configured to permit one or more client systems from the plurality of client systems access to the IDP depending on the value of respective client system's privacy tag and identifier tag.

16. A method of process parallelization using a process parallelization system, the method comprising:

receiving an insight request from one of a plurality of client systems of the process parallelization system;

analyzing the received insight request to identify subjects, operators, qualifiers and links therein;

identifying sensors and their locations needed to capture measurement variables corresponding with the identified subjects;

selecting the identified sensors from a bank of available sensors;

capturing data acquired by the selected sensors;

identifying classifiers operable to detect the identified subjects;

selecting the identified classifiers from a bank of available object classifiers and activity classifiers;

processing, using the selected classifiers, the data captured by the selected sensors;

configuring rules of an expert system, within an AI engine of the process parallelization system, according to the subjects, operators, qualifiers and links identified in the received insight request;

processing, using the expert system rules, outputs from the selected classifiers;

compiling an insight data packet (IDP) using the outputs of the selected classifiers, obtained from processing using the expert system rules; and issuing the IDP to the plurality of client systems of the process parallelization system.

17. The method of claim 16, wherein:

analyzing the received insight request to identify subjects, operators, qualifiers and links therein includes identifying dominant subjects, subordinate subjects, any links therebetween, and temporal, geographic and other further attributes of the received insight request; and identifying sensors and their locations needed to capture measurement variables includes determining a number and composition of sensor families created by the measurement variables corresponding to measurement locations determined from a received insight request and if a sensor is not available to produce measurement variables that satisfy the requirements of the received insight request, creating a dialogue data packet (DDP) to be issued to the client system from where the insight request originated.

18. The method of claim 16, wherein the AI engine comprises:

an object detection block and an activity detection block communicably coupled with an expert system block having the expert system therein; and wherein the object detection block comprises a plurality of object recognition engines; and wherein the activity detection block comprises a plurality of activity recognition engines; and a plurality of contextualiser units that include a plurality of user-supplied contextual data regarding at least one of: tacit, explicitly articulated rules and customs followed by subjects within observed scenes that are used to assist in the interpretation of the objects and activities detected by the object recognition engines and activity recognition engines respectively.

19. The method of claim 18, wherein the AI engine is operable to process insight requests received from the plurality of client systems in parallel through at least one of:

simultaneous processing of the measurements captured by different combinations and permutations of measurement sensors by the plurality of object recognition engines and activity recognition engines; and simultaneous use of the outputs from different combinations and permutations of the object recognition engines and activity recognition engines by the plurality of expert system rules configured according to each received insight request.

20. A non-transitory computer readable media having stored thereon instructions that when executed by a processor of a process parallelization system configure the processor to:

receive an insight request from one of a plurality of client systems of the process parallelization system;

analyze the received insight request to identify subjects, operators, qualifiers and links therein;

identify sensors and their locations needed to capture measurement variables corresponding with the identified subjects;

select the identified sensors from a bank of available sensors;

capture data acquired by the selected sensors;

identify classifiers operable to detect the identified subjects;

select the identified classifiers from a bank of available object classifiers and activity classifiers;

process, using the selected classifiers, the data captured by the selected sensors;

configure one or more rules of an expert system, within an artificial intelligence (AI) engine of the process parallelization system, according to the subjects, operators, qualifiers and links identified in the received insight request;

process, using the expert system rules, outputs from the selected classifiers;

compile an insight data packet (IDP) using the outputs of the selected classifiers obtained from processing using the expert system rules; and issue the IDP to the plurality of client systems of the process parallelization system.

* * * * *